(12) United States Patent
Furukawa et al.

(10) Patent No.: US 6,643,157 B2
(45) Date of Patent: Nov. 4, 2003

(54) RESONANT INVERTER CIRCUIT

(75) Inventors: Katsuhiko Furukawa, Utsunomiya (JP); Sadao Shinohara, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 12 days.

(21) Appl. No.: 10/115,979

(22) Filed: Apr. 5, 2002

(65) Prior Publication Data

US 2002/0159281 A1 Oct. 31, 2002

(30) Foreign Application Priority Data

Apr. 26, 2001 (JP) .................. P2001-130024

(51) Int. Cl.[7] .................. H02M 7/5387; H02M 3/24
(52) U.S. Cl. .................. 363/132; 363/98
(58) Field of Search .................. 363/132, 127, 363/98, 131, 97, 95, 17, 16

(56) References Cited

U.S. PATENT DOCUMENTS

| | | | |
|---|---|---|---|
| 5,047,913 A | | 9/1991 | De Doncker et al. |
| 5,172,309 A | * | 12/1992 | DeDoncker et al. ........ 363/132 |
| 5,258,902 A | * | 11/1993 | Lindbery et al. ............ 363/56 |
| 5,642,273 A | | 6/1997 | Lai et al. |
| 5,710,698 A | | 1/1998 | Lai et al. |
| 5,717,584 A | * | 2/1998 | Rajashekara et al. ........ 363/98 |
| 5,898,583 A | * | 4/1999 | Delgado et al. ............. 363/98 |
| 6,111,770 A | * | 8/2000 | Peng .......................... 363/131 |

* cited by examiner

*Primary Examiner*—Rajnikant B. Patel
(74) *Attorney, Agent, or Firm*—Arent Fox Kintner Plotkin & Kahn, PLLC

(57) ABSTRACT

A resonant inverter circuit is provided which can be made lighter in weight and smaller in capacity. With a main circuit in steady mode, IGBT of an auxiliary circuit are controlled and the energy of an electric current is stored in a resonant inductance. Next, snubber capacitors are charged and discharged by means of an electric current. At this time, the voltages across both terminals of IGBT corresponding with the snubber capacitors being charged becomes zero, and ZVS is achieved. Furthermore, when the snubber capacitors being discharged have been completely discharged, and free wheeling diodes and IGBT corresponding with these snubber capacitors conduct, both the voltages across both terminals of the IGBT and the electric current become zero and ZVS and ZCS are achieved.

6 Claims, 9 Drawing Sheets

MODE 4

MODE 5

MODE 6

MODE 10

MODE 11

RESONANT INVERTER CIRCUIT

BACKGROUND OF THE INVENTION

1. Field of the Invention

The present invention relates to an inverter circuit for driving a load such as a motor, and relates particularly to a resonant inverter circuit comprising a snubber capacitor for performing soft switching.

2. Description of the Related Art

Examples of conventional inverter circuits for driving a load such as a motor include the technology disclosed in U.S. Pat. No. 5,710,698, U.S. Pat. No. 5,642,273 and U.S. Pat. No. 5,047,913. For example, as shown in FIG. 8, in a soft switching inverter according to conventional technology, a motor 1 comprising a three phase induction motor or a DC brushless motor or the like is connected to the soft switching inverter as a load, and comprises, for example, an inverter using IGBT (Insulated Gate Bipolar Transistor) Q1 to Q6 as switching elements.

In the inverter, the IGBT Q1 to Q6 are connected to both sides of a DC power source 3 in a three phase bridge structure comprising a U phase, a V phase and a W phase. Free wheeling diodes (FWD) D1 to D6 are connected between a collector terminal and an emitter terminal of each IGBT for the purpose of circulating the regenerative energy produced by the inductive load of the motor 1 and the electric current energy stored by the inductive load. Furthermore, snubber capacitors C1 to C6 for absorbing the surge voltage applied between the collector terminal and the emitter terminal of the IGBT during turn-on or turn-off are connected between the collector terminal and the emitter terminal of each IGBT.

In addition, the DC power source 3 and a smoothing capacitor C9 are connected to the inverter. Mid-point voltage storage capacitors C7 and C8 for storing a mid-point voltage are connected in series to both sides of the smoothing capacitor C9. An inductance L1 which resonates with the snubber capacitors C1 and C2, and a bi-directional switching unit SU1 for channeling the resonant current via the inductance L1 are connected between the connection point of the mid-point voltage storage capacitors C7 and C8 and the connection point of the snubber capacitors C1 and C2 of the U phase. In a similar manner, an inductance L2 which resonates with the snubber capacitors C3 and C4, and a bi-directional switching unit SU2 for channeling the resonant current via the inductance L2 are connected between the connection point of the mid-point voltage storage capacitors C7 and C8 and the connection point of the snubber capacitors C3 and C4 of the V phase. In addition, an inductance L3 which resonates with the snubber capacitors C5 and C6, and a bi-directional switching unit SU3 for channeling the resonant current via the inductance L3 are connected between the connection point of the mid-point voltage storage capacitors C7 and C8 and the connection point of the snubber capacitors C5 and C6 of the W phase.

A configuration as shown above may also be called an auxiliary resonant commutated arm link type snubber inverter. In such a soft switching inverter, if for example the IGBT Q1 is turned off, and the IGBT Q2 is then turned on after a short delay, the charging current of the snubber capacitor C1 and the discharging current of the snubber capacitor C2 flow through the mid-point voltage storage capacitors C7 and C8 via the inductance L1. At the same time, if the IGBT Q4 and Q6 are turned off, and the IGBT Q3 and Q5 are then turned on after a short delay, the charging current of the snubber capacitors C4 and C6 and the discharging current of the snubber capacitors C3 and C5 are supplied from the mid-point voltage storage capacitors C7 and C8 via the inductance L2 and L3.

By charging and discharging the snubber capacitor according to the resonant current of the snubber capacitor and the inductance in this manner, when the IGBT is turned off and the snubber capacitor is charged, because the rise in the voltage applied to the IGBT is delayed according to the time constant applied by the snubber capacitor, ZVS (Zero Voltage Switching) of the IGBT can be realized. Conversely, if the snubber capacitor is discharged before the IGBT is turned on, a free wheeling diode conducts and the voltage and current applied to the IGBT becomes zero, thereby realizing ZVS (Zero Voltage Switching) and ZCS (Zero Current Switching) of the IGBT. Consequently, the loss which occurs during turn-on and turn-off of the switching elements such as the IGBTs, can be reduced.

Furthermore, FIG. 9 also shows a soft switching inverter according to conventional technology, which may also be called an auxiliary resonant AC link snubber inverter. In a similar manner as in the auxiliary resonant commutated arm link type snubber inverter shown in FIG. 8, a smoothing capacitor C9 and the inverter are connected to both sides of a DC power source 3. In the inverter, the IGBTs Q1 to Q6, to which are connected free wheeling diodes D1 to D6 and snubber capacitors C1 to C6 respectively, are connected in a three phase bridge structure comprising a U phase, a V phase and a W phase. An inductance L4 which resonates with the snubber capacitors C1 and C2, and a bi-directional switching unit SU4 for channeling the resonant current via the inductance L4 are connected between the connection point of the snubber capacitors C1 and C2 of the U phase of the inverter and the connection point of the snubber capacitors C3 and C4 of the V phase of the inverter. Furthermore, an inductance L5 which resonates with the snubber capacitors C3 and C4, and a bi-directional switching unit SU5 for channeling the resonant current via the inductance L5 are connected between the connection point of the snubber capacitors C3 and C4 of the V phase of the inverter and the connection point of the snubber capacitors C5 and C6 of the W phase of the inverter. In addition, an inductance L6 which resonates with the snubber capacitors C5 and C6, and a bi-directional switching unit SU6 for channeling the resonant current via the inductance L6 are connected between the connection point of the snubber capacitors C1 and C2 of the U phase of the inverter and the connection point of the snubber capacitors C5 and C6 of the W phase of the inverter.

The only difference between the auxiliary resonant AC link snubber inverter shown in FIG. 9 and the auxiliary resonant commutated arm link type snubber inverter shown in FIG. 8 is the path of the electric current for charging and discharging the snubber capacitors, and the principles involved in achieving ZVS and ZCS at each of the IGBT switching elements are the same.

In a soft switching inverter according to the above conventional technology, the electric current which flows through the IGBT (the switching elements) and the voltage applied to the IGBT can be controlled by forming a resonant circuit comprising the snubber capacitor and each inductance. Consequently, this is effective in reducing the loss which occurs in the switching elements during turn-on or turn-off.

However, because the core capacity required for the inductance is determined by the peak conducted current, as the controlled load current increases, the weight and capacity of the inductance also increases. Consequently, a problem arises in that a soft switching inverter according to conventional technology, which requires three inductances with an electric current which is at least as large as the load current, cannot be made smaller or lighter due to the increase in weight and capacity required for the inductances.

SUMMARY OF THE INVENTION

In consideration of the above circumstances, an object of the present invention is to provide a resonant inverter circuit that can be made lighter in weight and smaller in capacity.

In order to resolve the above problems, a resonant snubber inverter circuit according to the present invention comprises: six main switching elements (such as IGBT Q1 to Q6 of the embodiment) which either conduct or are cutoff by means of switching control, wherein three sets of two main switching elements which comprise each phase of a three phase bridge are connected in the three phase bridge, and each set of the main switching elements is connected in series to both terminals of a power source (such as the DC power source 3 of the embodiment); six free wheeling diodes (such as the free wheeling diodes D1 to D6 of the embodiment) connected in parallel between two terminals of each of the main switching elements; six snubber capacitors (such as the snubber capacitors C1 to C6 of the embodiment) connected in parallel between two terminals of each of the main switching elements; a three phase output terminal for connecting a load (such as the motor 1 of the embodiment), connected respectively to a connection point of the two main switching elements comprising each of the sets; a bridge circuit having six auxiliary switching elements (such as IGBT Q7 to Q12, and the protection diodes D7 to D12 of the embodiment) for causing an electric current to flow in a single direction, wherein three sets of two auxiliary switching elements are connected in a three phase bridge, and connection points common to the two auxiliary switching elements which comprise each set of the auxiliary switching elements are connected respectively to the three phase output terminal; and a resonant inductance (such as the resonant inductance Lr of the embodiment) forming a resonant circuit with the snubber capacitors, connected to an opposite terminal to a terminal connected to the connection point of the auxiliary switching elements.

In a soft switching inverter of the above structure, the charging and discharging of the six snubber capacitors is controlled by the resonant electric current flowing to the single inductance, which forms a resonant circuit with the six snubber capacitors which are connected in parallel to the six main switching elements, and the bridge circuit comprising the six auxiliary switching elements which are connected to the inductance. Consequently, whereas in the conventional technology one inductance is required for each phase producing a total of three inductances, in the present invention this number is reduced to one inductance across the entire circuit, making it possible to perform soft switching with less switching loss in the inverter circuit, and operate the resonant inverter circuit more efficiently. Consequently, the inverter can be made lighter in weight and smaller in capacity.

In a resonant snubber inverter circuit of the present invention, it is preferable that one of the auxiliary switching elements of each set of the auxiliary switching elements includes a unidirectional switching element (such as IGBT Q7, Q9, Q11 of the embodiment) which only conducts electric current in a direction flowing into the connection point of the auxiliary switching elements, and another auxiliary switching element of each set of the auxiliary switching elements includes a unidirectional switching element (such as IGBT Q8, Q10, Q12 of the embodiment) which only conducts electric current in a direction flowing out from the connection point of the auxiliary switching elements.

According to the above construction, using an inductance electric current which flows in one direction, those two snubber capacitors among the total of 6 snubber capacitors which are connected in series to the both sides of the power source are deemed to be one set of snubber capacitors comprising one phase of the three phase inverter, and the charging and discharging current of the snubber capacitors of a phase which flows in the opposite direction is deemed to be the charging and discharging current of snubber capacitors of another phase, and so for all the phase combinations in a circuit formed by a three phase bridge connection, it becomes possible to control the direction of electric current flow through each phase.

In a resonant snubber inverter circuit of the present invention, it is preferable that the unidirectional switching elements be elements having a withstand voltage greater than a power source voltage (such as the power source voltage VB of the embodiment) of the power source, in both forward and backward directions.

According to the above construction, it becomes possible for switching control to be performed on the auxiliary switching elements so that all of the charging and discharging electric current patterns of the snubber capacitors can be produced.

In a resonant snubber inverter circuit of the present invention, it is preferable that the unidirectional switching elements be insulated gate bipolar transistors (such as the IGBT Q7 to Q12 of the embodiment), each auxiliary switching element comprises the insulated gate bipolar transistor and a diode (such as the protection diodes D7 to D12 of the embodiment), and the diode is either one of a diode in which an anode terminal is connected to a collector terminal of the insulated gate bipolar transistor, and a diode in which a cathode terminal is connected to an emitter terminal of the insulated gate bipolar transistor.

According to the above construction, high speed voltage-driven switching becomes possible using the control voltage applied to the control terminal of the IGBT. In addition, the characteristics of the IGBT allow switching in which the saturation voltage between the terminals during conduction is low.

In a resonant snubber inverter circuit of the present invention, it is preferable that the unidirectional switching elements are metal oxide semiconductor field effects transistors, each auxiliary switching element comprises the metal oxide field effects transistor and a diode, and the diode is either one of a diode in which an anode terminal is connected to a drain terminal of the metal oxide field effects transistor, and a diode in which a cathode terminal is connected to a source terminal of the metal oxide field effects transistor.

According to the above construction, the characteristics of the MOSFET enable high speed voltage-driven switching by using the control voltage applied to the control terminal of the MOSFET.

In a resonant snubber inverter circuit of the present invention, it is preferable that the unidirectional switching elements are reverse blocking thyristors (such as the reverse blocking thyristors T1 to T6 of the embodiment).

According to the above construction, the characteristics of the thyristors enable current-driven switching of large currents by using the control current applied to the control terminal of the reverse blocking thyristors.

DETAILED DESCRIPTION OF THE PREFERRED EMBODIMENTS

As follows is a description of preferred embodiments of the present invention, with reference to the drawings.

Figure 1:
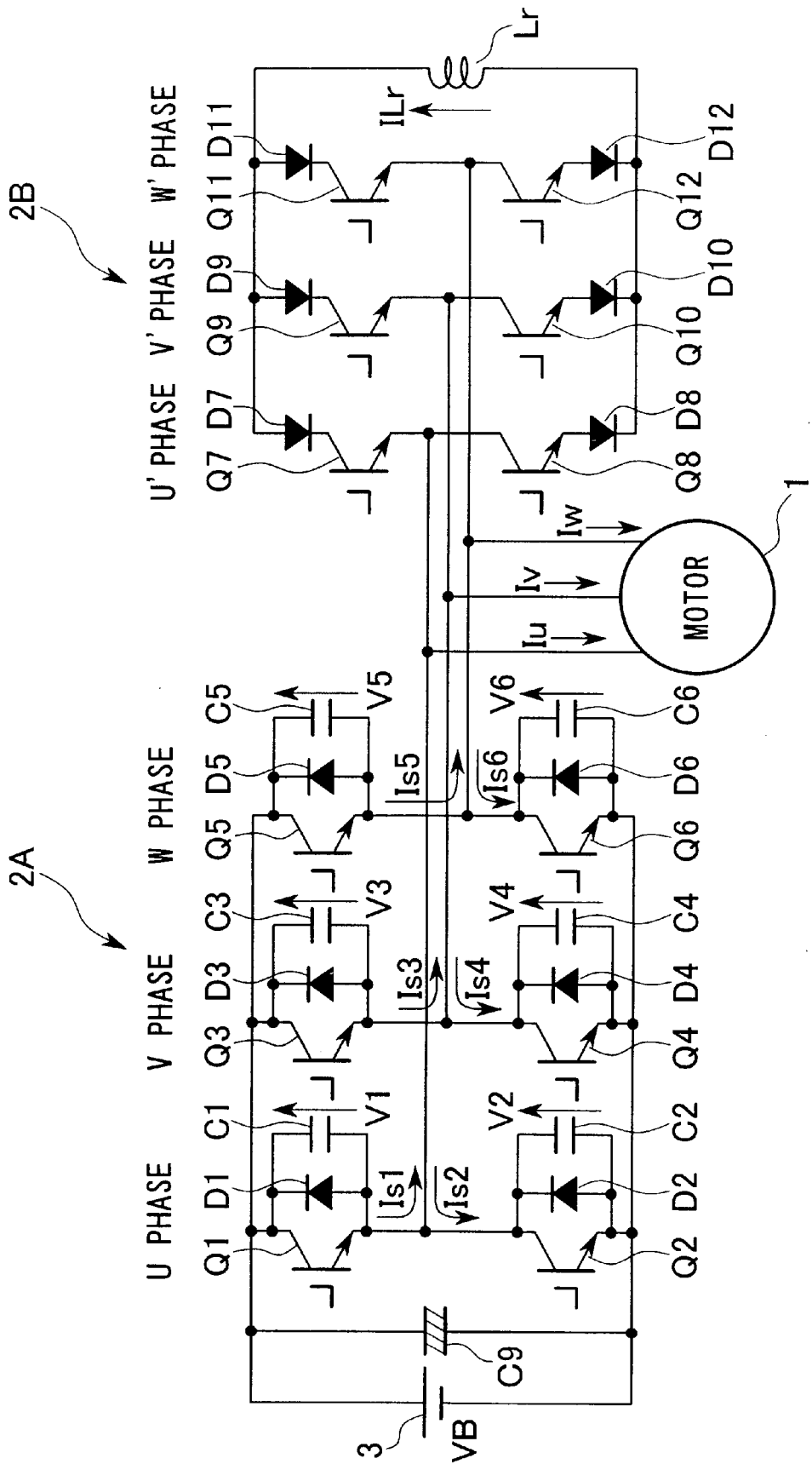
FIG. 1 is a circuit diagram showing the construction of an inverter circuit according to an embodiment of the present invention.
Figure 2A:
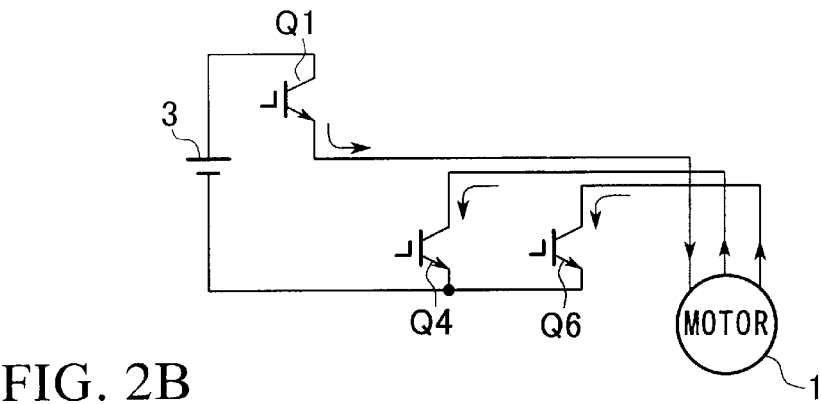
FIG. 2A shows the operation of a mode 1 of the inverter circuit according to the same embodiment.
Figure 2B:
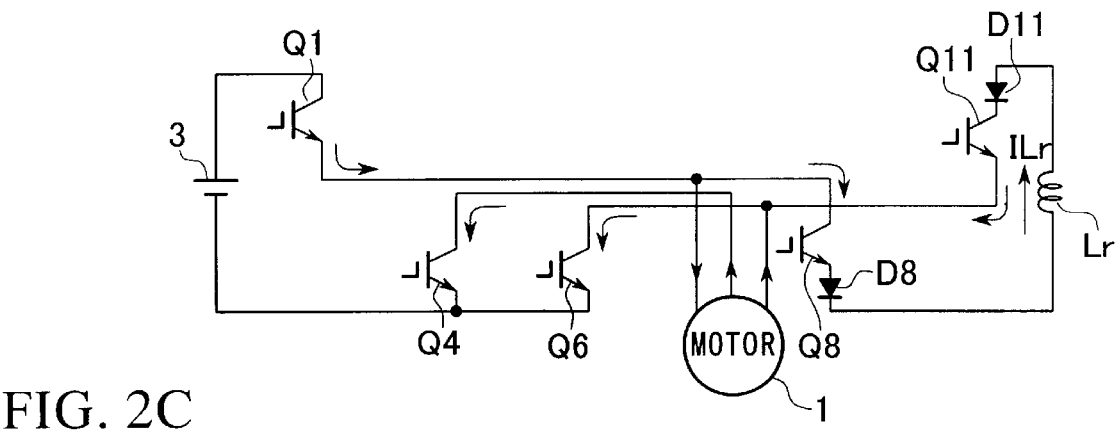
FIG. 2B shows the operation of a mode 2 of the inverter circuit according to the same embodiment.
Figure 2C:
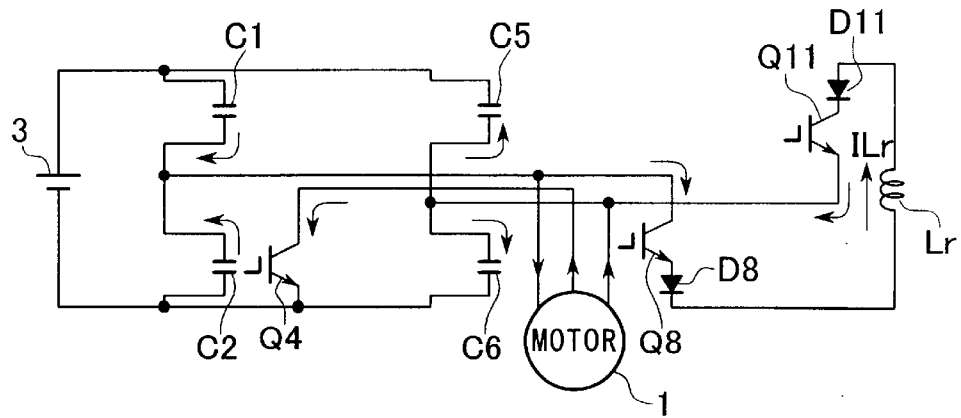
FIG. 2C shows the operation of a mode 3 of the inverter circuit according to the same embodiment.
Figure 3A:
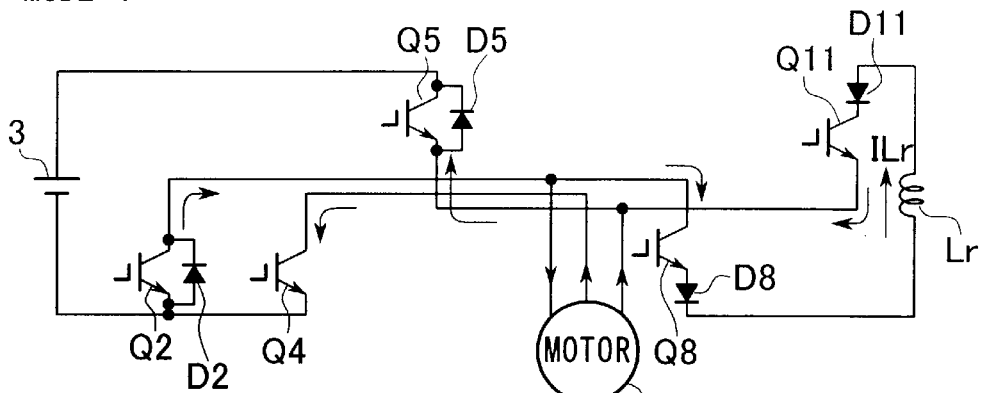
FIG. 3A shows the operation of a mode 4 of the inverter circuit according to the same embodiment.
Figure 3B:
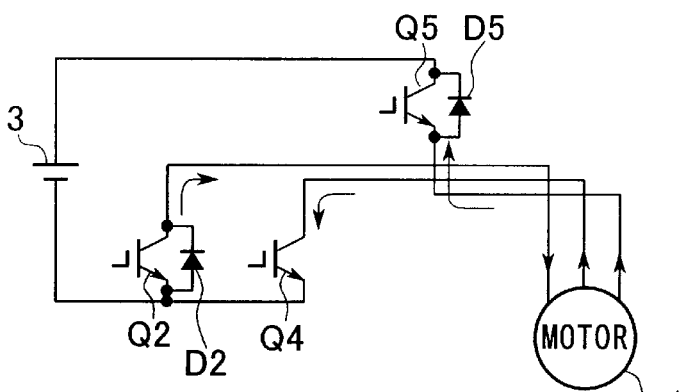
FIG. 3B shows the operation of a mode 5 of the inverter circuit according to the same embodiment.
Figure 3C:
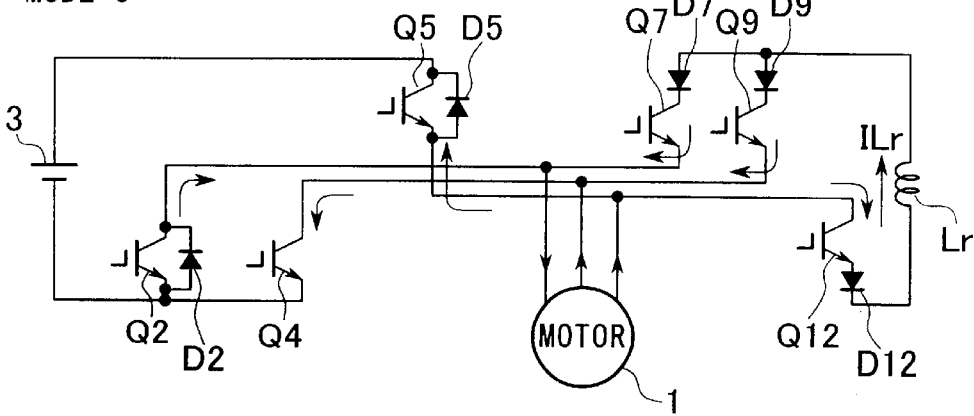
FIG. 3C shows the operation of a mode 6 of the inverter circuit according to the same embodiment.
Figure 4A:
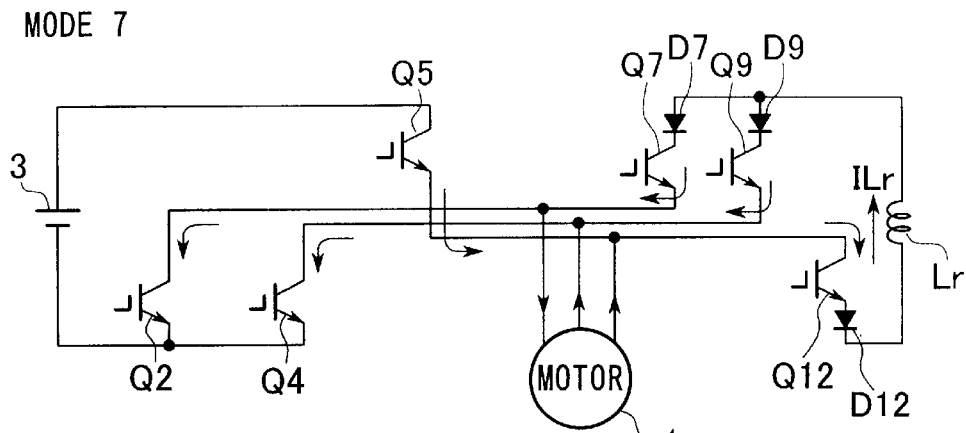
FIG. 4A shows the operation of a mode 7 of the inverter circuit according to the same embodiment.
Figure 4B:
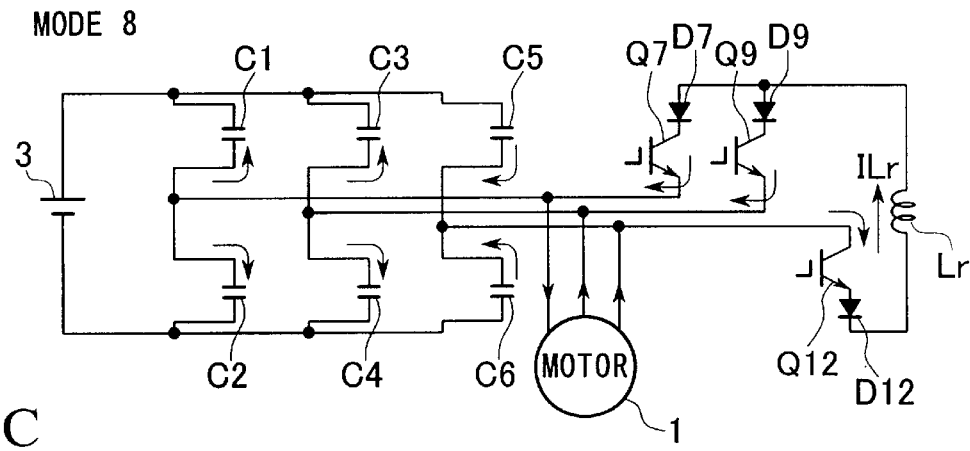
FIG. 4B shows the operation of a mode 8 of the inverter circuit according to the same embodiment.
Figure 4C:
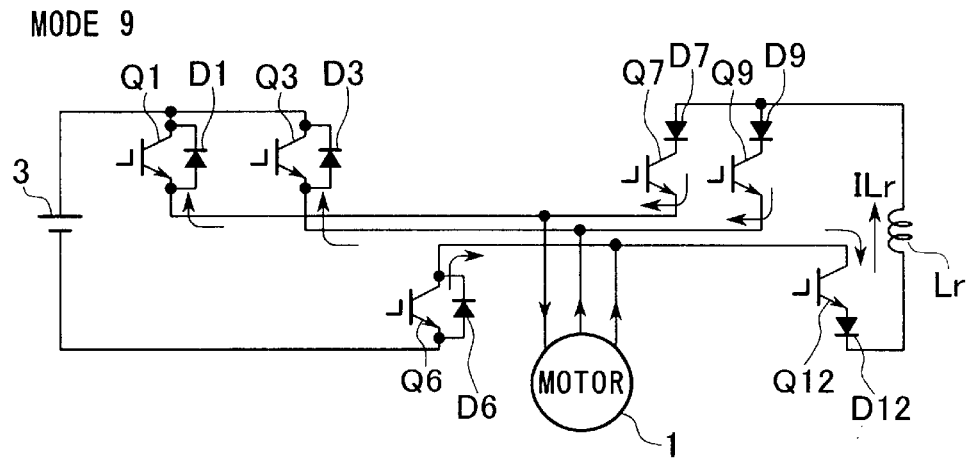
FIG. 4C shows the operation of a mode 9 of the inverter circuit according to the same embodiment.
Figure 5A:
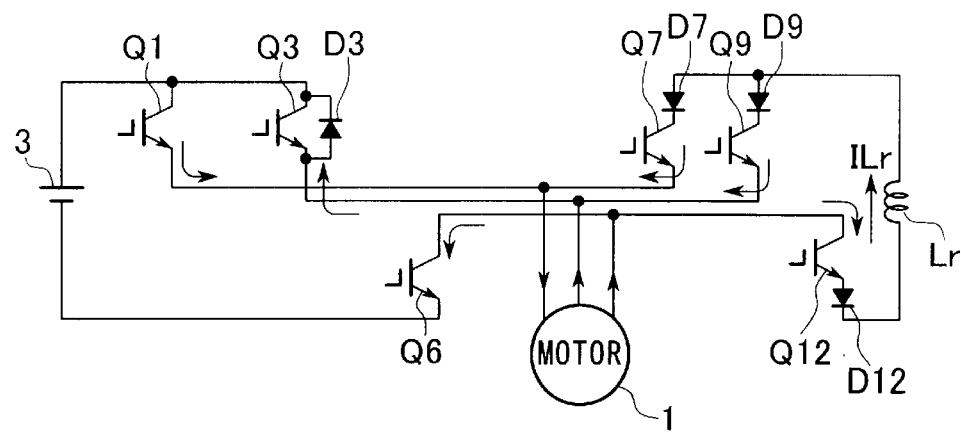
FIG. 5A shows the operation of a mode 10 of the inverter circuit according to the same embodiment.
Figure 5B:
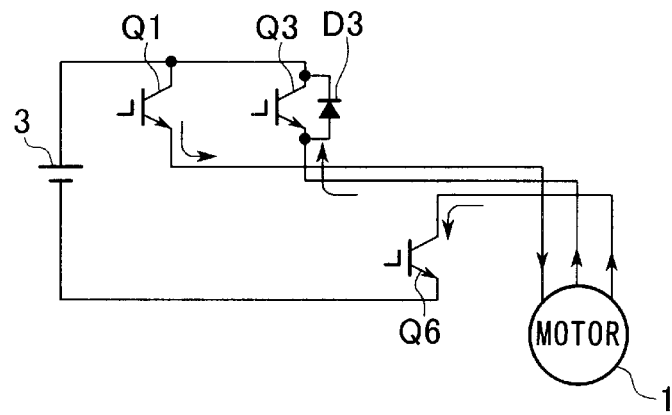
FIG. 5B shows the operation of a mode 11 of the inverter circuit according to the same embodiment.

FIG. 1 is a circuit diagram of an inverter circuit according to an embodiment of the present invention. In FIG. 1, the inverter circuit according to the present embodiment comprises a main circuit 2A to which a motor 1 comprising a three phase induction motor or a DC brushless motor or the like is connected as a load, and an auxiliary circuit 2B. The main circuit 2A comprises an inverter using, for example, IGBT Q1 to Q6 as the main switching elements. The auxiliary circuit 2B comprises auxiliary switching elements using, for example, IGBT Q7 to Q12 as unidirectional switching elements, and a resonator comprising a resonant inductance Lr. Moreover, IGBT Q7 to Q12 have a withstand voltage equal to or greater than the power source voltage VB of the DC power source 3 in both the forward and backward directions. Other elements such as reverse blocking thyristors, GTO (Gate Turn Off thyristors), bipolar transistors or MOSFET (Metal Oxide Semiconductor Field Effect Transistor) may also be used as the switching elements instead of the IGBTs used in Q1 to Q12.

Furthermore, the main circuit 2A is a circuit wherein IGBT Q1 to Q6 are connected in a three phase bridge structure, comprising a U phase, a V phase and a W phase, to both ends of a smoothing capacitor C9, which is connected in parallel to the DC power source 3. Free wheeling diodes D1 to D6 are connected between the collector terminal and the emitter terminal of each IGBT in order to circulate the regenerative energy produced by the inductive load of the motor 1, and the current energy stored in the inductive load. Specifically, the collector terminal of each IGBT is connected to the anode terminal of a free wheeling diode, and the emitter terminal of the IGBT is connected to the cathode terminal of the free wheeling diode, respectively. Furthermore, snubber capacitors C1 to C6 for absorbing the surge voltage applied between the collector terminal and the emitter terminal of an IGBT during turn-on and turn-off of the IGBT are also connected between the collector terminal and the emitter terminal of each IGBT Q1 to Q6, respectively.

Furthermore within the main circuit 2A, three phase output terminals for the U phase, the V phase and the W phase of the inverter circuit of the present embodiment extend from the connection points of the emitter terminal of the IGBT Q1 and the collector terminal of the IGBT Q2, the emitter terminal of the IGBT Q3 and the collector terminal of the IGBT Q4, and the emitter terminal of the IGBT Q5 and the collector terminal of the IGBT Q6. The terminals of the U phase, the V phase and the W phase of the motor 1 are connected respectively to these three phase output terminal. In addition, the auxiliary circuit 2B is also connected to the three phase output terminals of the main circuit 2A.

In the auxiliary circuit 2B, the IGBT Q7 to Q12 are connected in a three phase bridge structure comprising a U' phase, a V' phase and a W' phase to both ends of the resonant inductance Lr, which forms a resonant circuit with the snubber capacitors C1 to C6 used in the main circuit 2A. Protection diodes D7, D9 and D11 are connected to the collector terminals of the IGBT Q7, Q9 and Q11 respectively. More specifically, the collector terminals of the IGBT Q7, Q9 and Q11 are connected in series to the anode terminals of the protection diodes D7, D9 and D11 respectively. In a similar manner, protection diodes D8, D10 and D12 are connected to the emitter terminals of the IGBT Q8, Q10 and Q12 respectively. More specifically, the emitter terminals of the IGBT Q8, Q10 and Q12 are connected in series to the cathode terminals of the protection diodes D8, D10 and D12, respectively.

Moreover, here the series circuits comprising the unidirectional switching elements and the protection diodes are defined as auxiliary switching elements.

Furthermore as described above, the protection diodes D7, D9 and D11 are connected to the collector terminals of the IGBT Q7, Q9 and Q11, and the protection diodes D8, D10 and D12 are connected to the emitter terminals of the IGBT Q8, Q10 and Q12. However, the protection diodes D7, D9 and D11 may also be connected to the emitter terminals of the IGBT Q7, Q9 and Q11 and the protection diodes D8, D10 and D12 may also be connected to the collector terminals of the IGBT Q8, Q10 and Q12. Furthermore, the protection diodes could also all be connected to the collector terminals of the IGBT Q7 to Q12, or conversely, the protection diodes could be all connected to the emitter terminals of the IGBT Q7 to Q12. In brief, any configuration is suitable, provided the IGBTs are protected by the protection diodes from the voltage applied to the auxiliary switching elements incorporating the IGBTs.

In addition, the same applies in those cases where MOSFET are used instead of IGBT. In other words, the MOSFET should be protected from the voltage applied to the auxiliary switching elements incorporating the MOSFETs, by either connecting the anode terminal of the protection diode to the drain terminal of the MOSFET in series, or connecting the cathode terminal of the protection diode to the source terminal of the MOSFET in series.

Furthermore, when reverse blocking thyristors are used in the unidirectional switching elements, protection diodes are not needed in the auxiliary switching elements. Moreover, the construction employed when reverse blocking thyristors are used in the unidirectional switching elements is described below in detail.

Furthermore, the three phase output terminals of the main circuit 2A, and the auxiliary circuit 2B are connected in the following manner. Namely, the U phase terminal of the three phase output terminal is connected to the connection point in the U' phase of the auxiliary circuit 2B (in other words, the connection point between the auxiliary switching element incorporating the IGBT Q7 and the auxiliary switching element incorporating the IGBT Q8). In a similar manner, the V phase terminal of the three phase output terminal is connected to the connection point in the V' phase of the auxiliary circuit 2B (in other words, the connection point between the auxiliary switching element incorporating the IGBT Q9 and the auxiliary switching element incorporating the IGBT Q10). In addition, the W phase terminal of the three phase output terminal is connected to the connection point in the W' phase of the auxiliary circuit 2B (in other words, the connection point between the auxiliary switching element incorporating the IGBT Q11 and the auxiliary switching element incorporating the IGBT Q12).

More specifically, in the circuit structure shown in FIG. 1, the U phase terminal of the three phase output terminal is connected to the connection point between the emitter terminal of the IGBT Q7 and the collector terminal of the IGBT Q8. In a similar manner, the V phase terminal of the three phase output terminal is connected to the connection point between the emitter terminal of the IGBT Q9 and the collector terminal of the IGBT Q10. In addition, the W phase terminal of the three phase output terminal is connected to the connection point between the emitter terminal of the IGBT Q11 and the collector terminal of the IGBT Q12.

Moreover, when the connections of the IGBT and the protection diodes, which comprise the switching elements, are reversed, then the names of the appropriate terminals for connection are also substituted.

Next, the operation of the inverter circuit according to the present embodiment will be described using the drawings. In describing the operation of the circuit, first the symbols for defining the voltage and the electric current of each portion of the circuit diagram of FIG. 1 and the on/off switching of each switching element will be described.

Firstly, the voltage and electric current of each portion is defined in the manner described below.

(1) With the collector side of the IGBT Q1 defined as the forward direction, the voltage applied to both ends of the parallel circuit comprising the IGBT Q1, the free wheeling diode D1 and the snubber capacitor C1 is defined as V1. Furthermore, the electric current flowing from this parallel circuit towards the load (the motor 1) is defined as Is1, with this flow direction defined as the forward direction.

(2) In a similar manner, with the collector side of the IGBT Q3 defined as the forward direction, the voltage applied to both ends of the parallel circuit comprising the IGBT Q3, the free wheeling diode D3 and the snubber capacitor C3 is defined as V3. Furthermore, the electric current flowing from this parallel circuit towards the load is defined as Is3, with this flow direction defined as the forward direction.

(3) With the collector side of the IGBT Q5 defined as the forward direction, the voltage applied to both ends of the parallel circuit comprising the IGBT Q5, the free wheeling diode D5 and the snubber capacitor C5 is defined as V5. Furthermore, the electric current flowing from this parallel circuit towards the load is defined as Is5, with this flow direction defined as the forward direction.

Furthermore, electric currents Is2, Is4 and Is6, for which the definitions for forward and reverse current directions are opposite to those of the electric currents Is1, Is3 and Is5 described in (1) to (3) above, and voltages V2, V4 and V6 are defined as follows.

(4) With the collector side of the IGBT Q2 defined as the forward direction, the voltage applied to both ends of the parallel circuit comprising the IGBT Q2, the free wheeling diode D2 and the snubber capacitor C2 is defined as V2. Furthermore, the electric current flowing from the load towards this parallel circuit is defined as Is2, with this flow direction defined as the forward direction.

(5) In a similar manner, with the collector side of the IGBT Q4 defined as the forward direction, the voltage applied to both ends of the parallel circuit comprising the IGBT Q4, the free wheeling diode D4 and the snubber capacitor C4 is defined as V4. Furthermore, the electric current flowing from the load towards this parallel circuit is defined as Is4, with this flow direction defined as the forward direction.

(6) With the collector side of the IGBT Q6 defined as the forward direction, the voltage applied to both ends of the parallel circuit comprising the IGBT Q6, the free wheeling diode D6 and the snubber capacitor C6 is defined as V6. Furthermore, the electric current flowing from the load towards this parallel circuit is defined as Is6, with this flow direction defined as the forward direction.

In addition, when current flow into the load is defined as the forward direction, the three phase electric currents which flow only to the load are defined as Iu, Iv and Iw respectively.

Furthermore, the on/off state of the IGBT Q1 to Q12 is defined in the following manner, using a logical value "1"/"0".

Firstly, a state where the upper IGBT Q1 of the U phase of the main circuit 2A is on and the lower IGBT Q2 is off, is represented as "1", and a state where the upper IGBT Q1 of the U phase is off and the lower IGBT Q2 is on is represented as "0". In a similar manner, a state where the upper IGBT Q3 of the V phase is on and the lower IGBT Q4 is off is represented as "1", and a state where the upper IGBT Q3 of the V phase is off and the lower IGBT Q4 is on is represented as "0". Likewise, in the W phase, a state where the upper IGBT Q5 of the W phase is on and the lower IGBT Q6 is off is represented as "1", and a state where the upper IGBT Q5 of the W phase is off and the lower IGBT Q6 is on is represented as "0".

Furthermore, a state where the upper IGBT Q7 of the U' phase of the auxiliary circuit 2B is on and the lower IGBT Q8 is off is represented as "1", and a state where the lower IGBT Q8 of the U' phase is on and the upper IGBT Q7 is off is represented as "0". In a similar manner, a state where the upper IGBT Q9 of the V' phase is on and the lower IGBT Q10 is off is represented as "1", and a state where the lower IGBT Q10 of the V' phase is on and the upper IGBT Q9 is off is represented as "0". Likewise, in the W' phase, a state where the upper IGBT Q11 of the W' phase is on and the lower IGBT Q12 is off is represented as "1", and a state where the lower IGBT Q12 of the W' phase is on and the upper IGBT Q11 is off is represented as "0".

Accordingly, for example, (U, V, W)=(1, 0, 0) indicates a state where the IGBT Q1 is on, the IGBT Q2 is off, the IGBT Q3 is off, the IGBT Q4 is on, the IGBT Q5 is off, and the IGBT Q6 is on.

Moreover, in the layout of components shown in FIG. 1, the upper IGBT Q1, Q3, Q5, Q7, Q9 and Q11 are defined as "H" side switching elements, and the lower IGBT Q2, Q4, Q6, Q8, Q10 and Q12 are defined as "L" side switching elements.

Furthermore, a state where both the H and L side IGBT are off cannot be shown by "0" or "1". An annotation for this state "H, L simultaneously off" is added to the waveform diagram of FIG. 6 as an intermediate level between "1" and "0".

In addition, the operation of each mode from mode 1 to mode 11 as shown in FIG. 2A to FIG. 5B is defined below. Here, the case where (U, V, W) are controlled so that (1, 0, 0)−>(0, 0, 1)−>(1, 1, 0) is taken as an example for describing the control mode of the inverter circuit according to the present embodiment. A summary of the operation (state) of the modes 1 to 11 for this particular case is shown below.

(a) Mode 1: Steady mode where (U, V, W)=(1, 0, 0).
(b) Mode 2: Initial electric current storage mode in a transition state from (1, 0, 0) to (0, 0, 1).
(c) Mode 3: Resonant mode in the transition state from (1, 0, 0) to (0, 0, 1).
(d) Mode 4: Regenerative mode in the transition state from (1, 0, 0) to (0, 0, 1).
(e) Mode 5: Steady mode where (U, V, W)=(0, 0, 1)
(f) Mode 6: Initial electric current storage mode in a transition state from (0, 0, 1) to (1, 1, 0) (step 1).
(g) Mode 7: Initial electric current storage mode in the transition state from (0, 0, 1) to (1, 1, 0) (step 2).
(h) Mode 8: Resonant mode in the transition state from (0, 0, 1) to (1, 1, 0).
(i) Mode 9: Regenerative mode in the transition state from (0, 0, 1) to (1, 1, 0) (step 1).
(j) Mode 10: Regenerative mode in the transition state from (0, 0, 1) to (1, 1, 0) (step 2).
(k) Mode 11: Steady mode where (U, V, W)=(1, 1, 0).

Moreover, in cases where the control sequence is different from the above, the operation of the circuit is similar to that described above.

Figure 6:
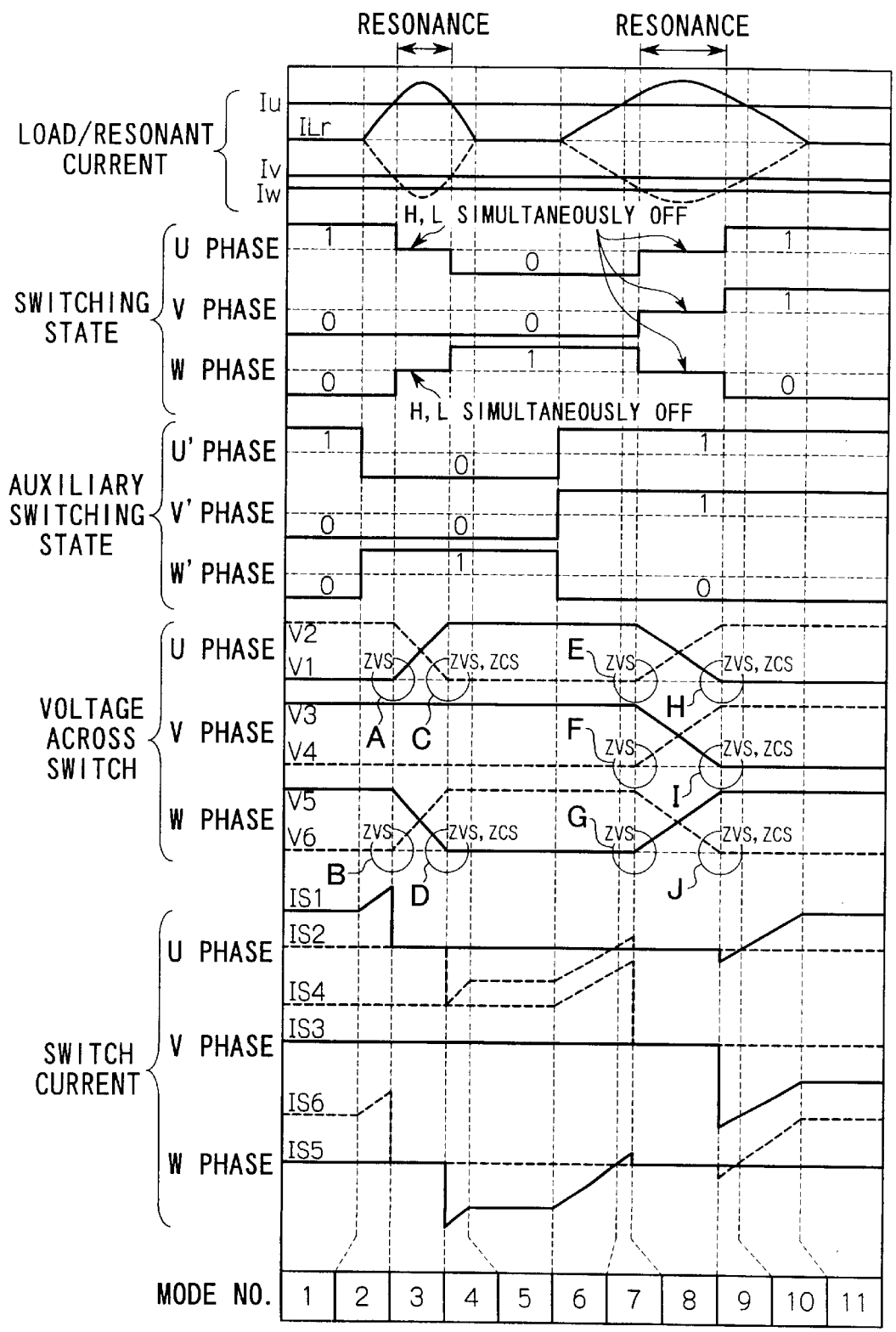
FIG. 6 is a waveform diagram showing the changing waveforms of each portion for each mode of the inverter circuit according to the same embodiment.

Furthermore, in the waveform diagram shown in FIG. 6, the mode number displayed in the bottom row corresponds with the aforementioned mode numbers, and the various waveforms represent signal waveforms corresponding with each of the above modes.

Next, the operation of the inverter circuit according to the present embodiment is described in greater detail based on the notation defined above for the voltage and the current of each portion, and the on/off state of each of the switching elements.

Firstly, because in mode 1 (a) the inverter circuit is in the steady state in which (U, V, W)=(1, 0, 0), the current which flows from the DC power source 3 through the IGBT Q1 towards the U phase terminal of the motor 1, flows back from the V phase terminal and the W phase terminal of the motor 1 and returns to the DC power source 3 through the IGBT Q4 and the IGBT Q6 respectively. Furthermore, in the steady state of mode 1, the H side switching elements IGBT Q7, Q9 and Q12 of the auxiliary circuit 2B are on, and the L side switching elements IGBT Q8, Q10 and Q11 are off, but because there is no energy stored in the resonant inductance Lr, no current flows to the resonant inductance Lr.

Next, with the circuit in the state described by mode 1, if the IGBT Q8 and Q11 of the auxiliary circuit 2B are turned on and the IGBT Q7 and Q12 are turned off causing a transition to the state of mode 2 (b), then a portion of the electric current flowing from the IGBT Q1 to the U phase terminal of the motor 1 flows through the resonant inductance Lr and returns to the DC power source 3 via the IGBT Q4 and the IGBT Q6, meaning the resonant inductance Lr stores the energy due to the current ILr as an initial electric current.

When sufficient electric current ILr is stored, and the size of the electric current ILr is an amount approximately equal to that of any one of the load electric currents Iu, Iv or Iw flowing to the motor 1 (although there is a positive and negative distinction according to the direction of the electric current flow, in this case absolute values are compared), IGBT Q1 and Q6 are turned off, and the mode shifts to the resonant mode of mode 3 (c). Until this point IGBT Q1 and Q6 have been on, and no voltage has been applied to the snubber capacitors C1 and C6, but the transition to the resonant mode causes the voltages V1 and V6 across both sides of the snubber capacitors C1 and C6 to rise, and the charging of these capacitors begins. However, the voltages V1 and V6 across both sides of the snubber capacitors C1 and C6 cannot rise rapidly due to the time constant applied by these capacitors, and the IGBT Q1 and Q6 are turned off with the voltage across both sides of the snubber capacitors C1 and C6 (in other words the voltages V1 and V6 across both sides of the IGBT Q1 and Q6) at zero, and consequently ZVS is achieved.

In the waveform diagram in FIG. 6, when the absolute value of the load electric current Iu or Iv is approximately equal to the electric current ILr, the switching state in the main circuit 2A changes. Moreover, the dotted line for the electric current ILr represents the comparison of the absolute value with the load electric currents Iv and Iw. Furthermore, the ZVS of the IGBT Q1 and Q6 are indicated by the points A and B respectively.

Furthermore, until this point, a voltage similar to the power source voltage VB had been applied to the snubber capacitors C2 and C5, but in the resonant mode of mode 3, because electrical discharge from the snubber capacitors C2 and C5 begins due to the snubber capacitors C1 and C6 being connected, the voltages V2 and V5 across both sides of the snubber capacitors C2 and C5 decrease together with the charging of the snubber capacitors C1 and C6. The charging current of these snubber capacitors C1 and C6 and the discharging current of the snubber capacitors C2 and C5 circulates within the circuit through the resonant inductance Lr, as a resonant current.

In addition, if this resonant mode continues, further resonant electric current flows due to the energy stored in the resonant inductance Lr, and when the voltages V2 and V5 across both sides of the snubber capacitors C2 and C5 reach zero, the energy stored in the resonant inductance Lr then flows via the free wheeling diodes D2 and D5.

Here, the IGBT Q2 and Q5, which are connected in parallel to the free wheeling diodes D2 and D5, are turned on, and the regenerative mode of mode 4 (d) is entered. At this time, the IGBT Q2 and Q5 adopt ZVS and are turned on with the voltages across both sides of the snubber capacitors C2 and C5 (in other words, the voltages V2 and V5 across both sides of the IGBT Q2 and Q5) at zero. Furthermore, because all of the electric current flows through the free wheeling diodes D2 and D5 and no electric current flows through the IGBT Q2 and Q5, the IGBT Q2 and Q5 also adopt ZCS and are turned on with the electric current at zero.

In the waveform diagram in FIG. 6, the ZVS and the ZCS of the IGBT Q2 and Q5 are indicated by point C and point D respectively.

Furthermore, in the regenerative mode of mode 4, a regenerative electric current which flows from the W phase terminal of the motor 1 to the positive electrode side of the DC power source 3 via the IGBT Q5, a regenerative electric current which flows from the V phase terminal of the motor 1 to the negative electrode side of the DC power source 3 via the IGBT Q4, a regenerative electric current which flows to the U phase terminal of the motor 1 through the IGBT Q2, and an electric current which flows through the IGBT Q8, the resonant inductance Lr and the IGBT Q11 are generated from the regenerative energy of the motor 1 and the energy stored in the resonant inductance Lr.

However, because the power source voltage of the DC power source 3 is applied as a reverse voltage to the resonant inductance Lr in order to reduce the electric current ILr, the electric current ILr gradually decreases and reaches zero. When the electric current ILr reaches zero, the electric current attempting to flow to the emitter side of the IGBT Q8 and Q11 by means of the power source voltage of the DC power source 3 is stopped by the protection diodes D8 and D11, and the steady mode of mode 5 (e) is entered.

Next is a description of the operation of shifting from mode 5 which is a steady mode in which (U, V, W)=(0, 0, 1), to mode 11 which is a steady mode in which (U, V, W)=(1, 1, 0).

Firstly, in the steady mode of mode 5, when the IGBT Q7, Q9 and Q12 of the auxiliary circuit 2B are turned on, and the IGBT Q8, Q10 and Q11 are turned off, the sequence shifts to the initial electric current storage mode (step 1) of the mode 6 (f). Consequently, a portion of the regenerative current of the motor 1 flowing from the W phase terminal of the motor 1 to the IGBT Q5 flows through the resonant inductance Lr and returns to the motor 1 or the DC power source 3 via the IGBT Q7 and Q9, storing the energy due to the electric current ILr in the resonant inductance Lr as an initial electric current.

In this state, when the electric current ILr reaches an electric current value exceeding that of the load electric current Iu or Iw, the initial electric current storage mode (step 2) of the mode 7 (g) is entered, and the electric current which had flowed in the free wheeling diodes D2 and D5 disappears, and an electric current flows through the IGBT Q2 and Q5 in a forward direction. Here, when the IGBT Q2, Q4 and Q5 are turned off, then in a similar manner as was described for the aforementioned mode 3, a discharge current flows to the snubber capacitors C1, C3 and C6 as a resonant electric current of the resonant inductance Lr, a charging current flows to the snubber capacitors C2, C4 and C5, and the resonant mode of mode 8 (h) is entered.

Moreover, in a similar manner as the IGBT Q1 and Q6 in mode 3, the IGBT Q2, Q4 and Q5 adopt ZVS and are turned off with the voltage across both sides of the snubber capacitors C2, C4 and C5 (in other words, the voltages V2, V4 and V5 across both sides of the IGBT Q2, Q4 and Q5) at zero.

In the waveform diagram in FIG. 6, at the point where the electric current ILr exceeds the absolute value of the load electric current Iu or Iw, the switching state in the main circuit 2A changes. Furthermore, the ZVS of the IGBT Q2, Q4 and Q5 is indicated by point E, point F and point G.

In addition, if this resonant mode continues, then in a similar manner to mode 4, further resonant current flows due to the energy stored in the resonant inductance Lr, and when the voltages V1, V3 and V6 across both sides of the snubber capacitors C1, C3 and C6 reaches zero, the energy stored in the resonant inductance Lr then flows via the free wheeling diodes D1, D3 and D6.

Here, if the IGBT Q1, Q3 and Q6, which are connected in parallel to the free wheeling diodes D1, D3 and D6, are turned on, then the regenerative mode (step 1) of mode 9 (i) is entered. At this time, the IGBT Q1, Q3 and Q6 adopt ZVS and are turned on with the voltage across both sides of the snubber capacitors C1, C3 and C6 (in other words, the voltages V1, V3 and V6 across both sides of the IGBT Q1, Q3 and Q6) at zero. Furthermore, because all of the electric current flows to the free wheeling diodes D1, D3 and D6, and no electric current flows to the IGBT Q1, Q3 and Q6, the IGBT Q1, Q3 and Q6 adopt ZCS and are turned on with the electric current at zero.

In the waveform diagram FIG. 6, the ZVS and ZCS of the IGBT Q1, Q3 and Q6 are indicated by point H, point I and point J respectively.

Furthermore, if this state is continued, the electric current of the free wheeling diodes D1 and D6 which flowed by means of the energy stored in the resonant inductance Lr ceases to flow, and the regenerative mode (step 2) of mode 10 (j) is entered wherein the regenerative current of the motor 1 flows in a forward direction towards the IGBT Q1 and Q6.

In addition, because the power source voltage of the DC power source 3 is applied as a reverse voltage to the resonant inductance Lr in order to reduce the electric current ILr, the electric current ILr gradually decreases and reaches zero. When the electric current ILr reaches zero, the electric current attempting to flow to the emitter side of the IGBT Q7, Q9 and Q12 by means of the power source voltage of the DC power source 3 is stopped by the protection diodes D7, D9 and D12, and the steady mode of mode 11 (k) is entered.

The operation of mode 1 (a) to mode 11 (k) as shown in FIG. 2A to FIG. 5B in an inverter circuit according to the present embodiment is described above using the example where (U, V, W) are controlled so that (1, 0, 0)−>(0, 0, 1)−>(1, 1, 0). Moreover, when performing spatial vector PWM (Pulse Width Modulation) control in the inverter circuit, the operation of the inverter circuit in the transition between other control vectors is the same as the above case where (U, V, W) is controlled so that (1, 0, 0)−>(0, 0, 1)−>(1, 1, 0), and as such the description is omitted.

Figure 7:
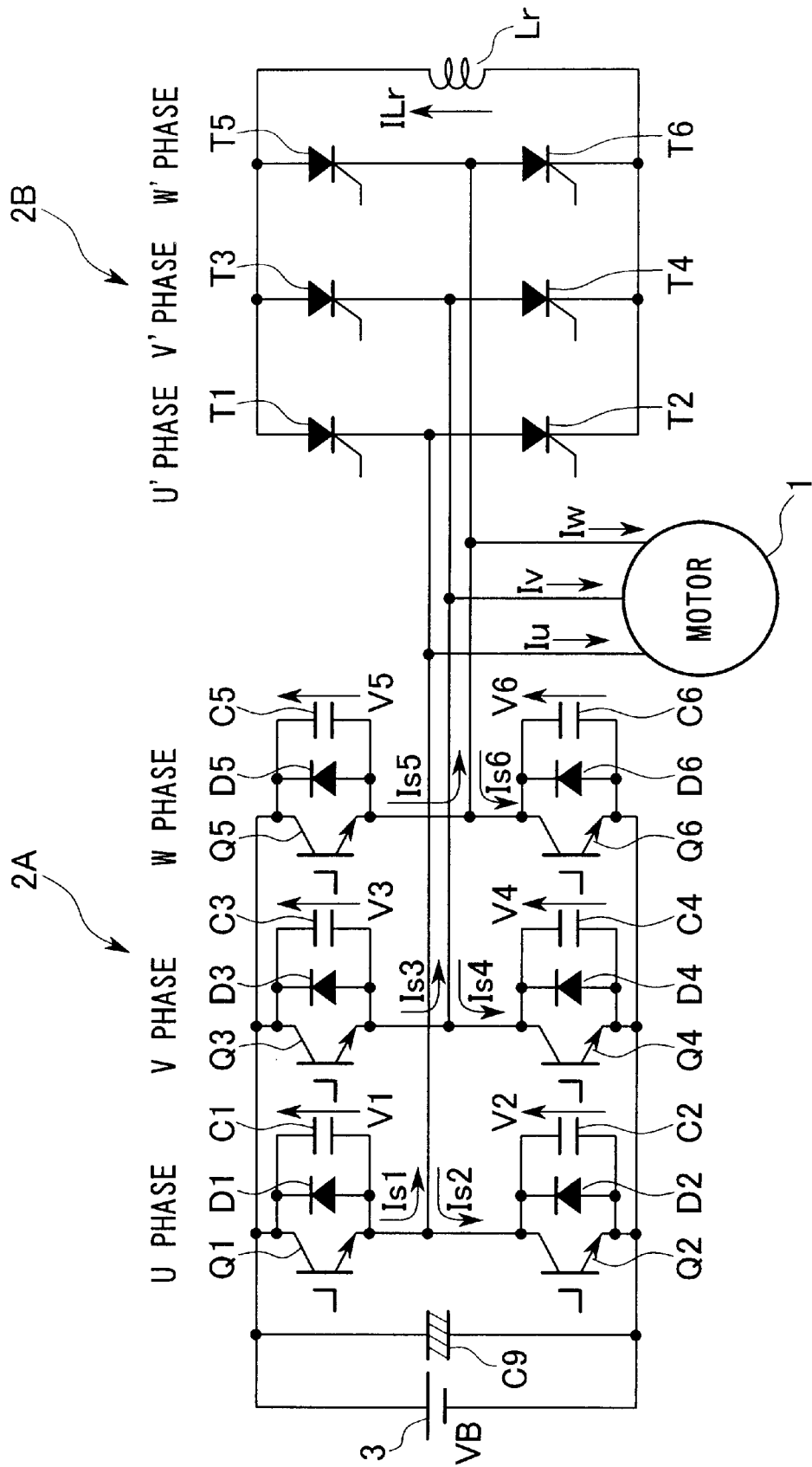
FIG. 7 is a circuit diagram showing the inverter circuit according to another embodiment, wherein reverse blocking thyristors are used as the auxiliary switching elements.
Figure 8:
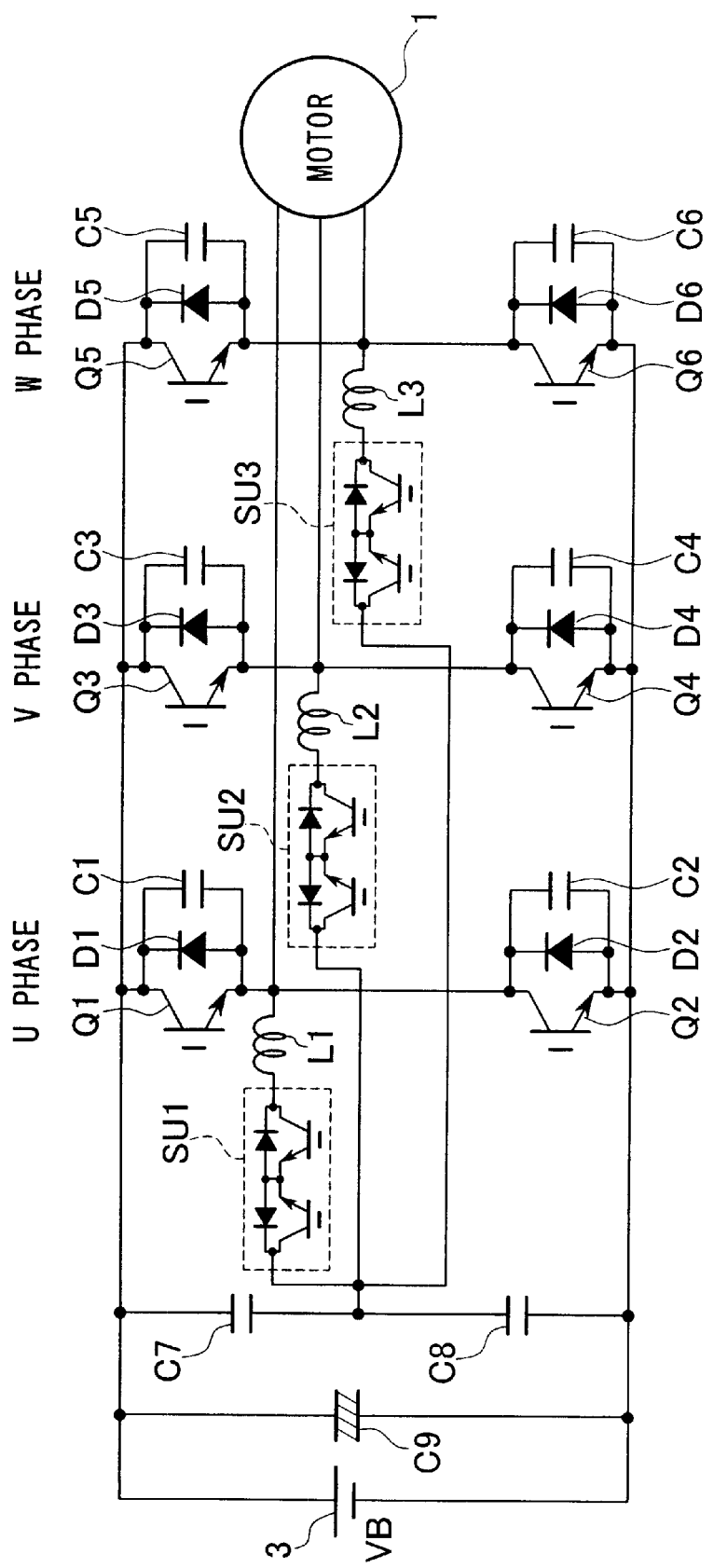
FIG. 8 is a circuit diagram showing the construction of an inverter circuit according to conventional technology.
Figure 9:
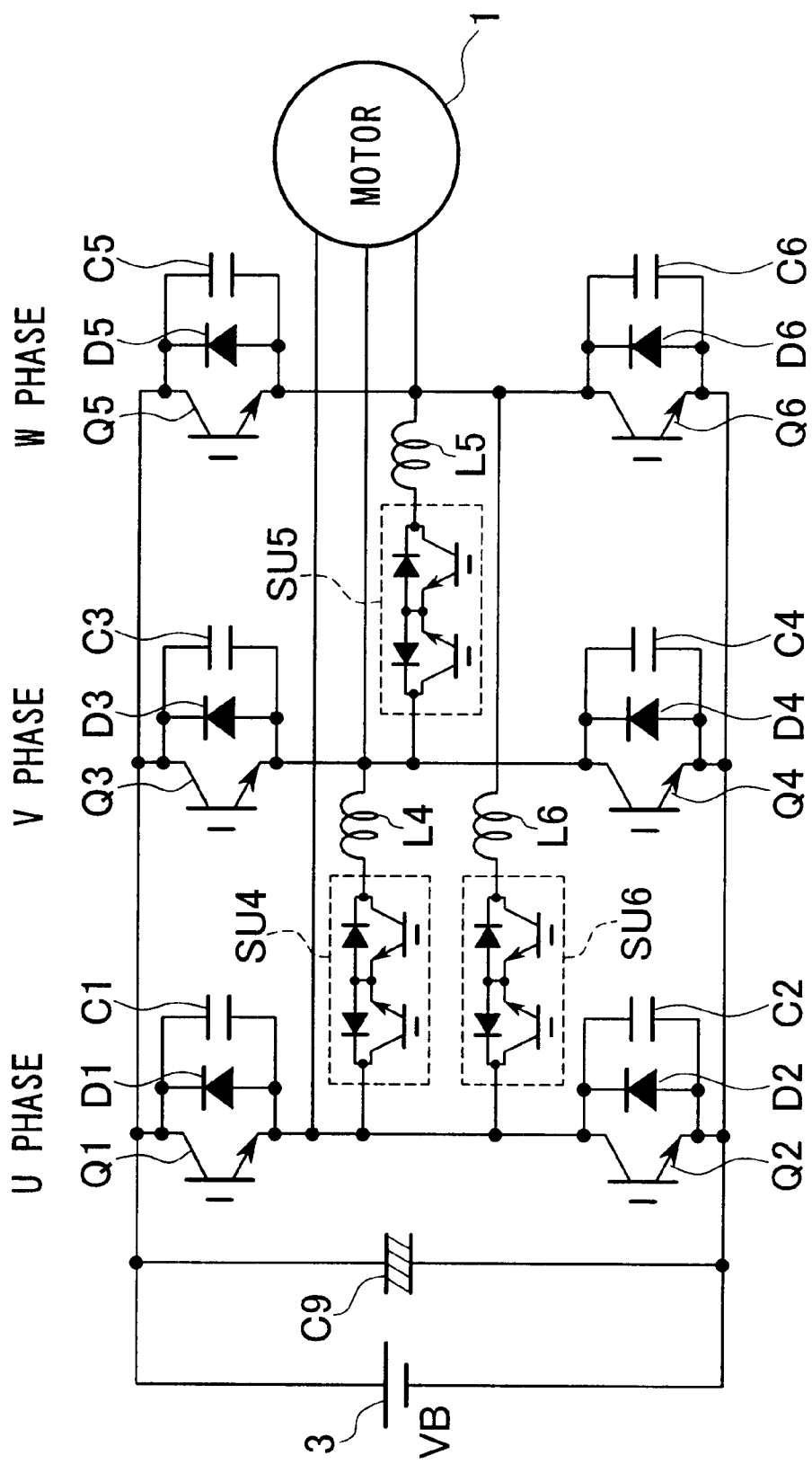
FIG. 9 is a circuit diagram showing another construction of an inverter circuit according to conventional technology.

Furthermore, FIG. 7 shows a circuit diagram of an inverter circuit according to another embodiment of the present invention, wherein reverse blocking thyristors T1 to T6 are used as the auxiliary switching elements of the auxiliary circuit 2B. The theoretical operation of the circuit in FIG. 7 is the same as the circuit shown in FIG. 1, but differs in the on/off control of the auxiliary switching elements, in that the control terminals of the aforementioned IGBTs are voltage controlled, whereas the control terminals of the reverse blocking thyristors T1 to T6 are current controlled. In the circuit in FIG. 7, it is possible to control large currents depending on the characteristics of the thyristors.

What is claimed is:

1. A resonant inverter circuit comprising:
six main switching elements which either conduct or are cutoff by means of switching control, wherein three sets of two main switching elements which comprise each phase of a three phase bridge are connected in the three phase bridge, and each set of the main switching elements is connected in series to both terminals of a power source;

six free wheeling diodes connected in parallel between two terminals of each of the main switching elements;

six snubber capacitors connected in parallel between two terminals of each of the main switching elements;

a three phase output terminal for connecting a load, connected respectively to a connection point of the two main switching elements comprising each of the sets;

a bridge circuit having six auxiliary switching elements for causing an electric current to flow in a single direction, wherein three sets of two auxiliary switching elements are connected in a three phase bridge, and connection points common to the two auxiliary switching elements which comprise each set of the auxiliary switching elements are connected respectively to the three phase output terminal; and a resonant inductance forming a resonant circuit with the snubber capacitors, connected to an opposite terminal to a terminal connected to the connection point of the auxiliary switching elements.

2. An inverter circuit according to claim 1, wherein one of the auxiliary switching elements of each set of the auxiliary switching elements includes a unidirectional switching element which only conducts electric current in a direction flowing into the connection point of the auxiliary switching elements, and another auxiliary switching element of each set of the auxiliary switching elements includes a unidirectional switching element which only conducts electric current in a direction flowing out from the connection point of the auxiliary switching elements.

3. An inverter circuit according to claim 2, wherein the unidirectional switching elements are elements having a withstand voltage greater than a power source voltage of the power source, in both forward and backward directions.

4. An inverter circuit according to claim 2, wherein the unidirectional switching elements are insulated gate bipolar transistors, each auxiliary switching element comprises the insulated gate bipolar transistor and a diode, and the diode is either one of a diode in which an anode terminal is connected to a collector terminal of the insulated gate bipolar transistor, and a diode in which a cathode terminal is connected to an emitter terminal of the insulated gate bipolar transistor.

5. An inverter circuit according to claim 2, wherein the unidirectional switching elements are metal oxide semiconductor field effects transistors, each auxiliary switching element comprises the metal oxide field effects transistor and a diode, and the diode is either one of a diode in which an anode terminal is connected to a drain terminal of the metal oxide field effects transistor, and a diode in which a cathode terminal is connected to a source terminal of the metal oxide field effects transistor.

6. An inverter circuit according to claim 2, wherein the unidirectional switching elements are reverse blocking thyristors.

* * * * *